(12) United States Patent
Lin

(10) Patent No.: US 9,811,643 B2
(45) Date of Patent: Nov. 7, 2017

(54) METHOD, SYSTEM, SERVER AND TERMINAL FOR IMPLEMENTING SECURE TRANSMISSION OF DATA

(71) Applicant: Tencent Technology (Shenzhen) Company Ltd., Shenzhen (CN)

(72) Inventor: Yuancan Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/724,060

(22) Filed: May 28, 2015

(65) Prior Publication Data

US 2015/0286805 A1 Oct. 8, 2015

Related U.S. Application Data

(63) Continuation of application No. PCT/CN2013/086825, filed on Nov. 11, 2013.

(30) Foreign Application Priority Data

Dec. 12, 2012 (CN) .......................... 2012 1 0535266

(51) Int. Cl.
G06F 21/10 (2013.01)
H04L 29/06 (2006.01)
G06F 21/62 (2013.01)

(52) U.S. Cl.
CPC .......... *G06F 21/10* (2013.01); *G06F 21/6209* (2013.01); *H04L 63/0428* (2013.01);
(Continued)

(58) Field of Classification Search
CPC ......... G06F 21/6209; G06F 2221/0784; G06F 2221/2107
See application file for complete search history.

(56) References Cited

U.S. PATENT DOCUMENTS 6,473,742 B1* 10/2002 Sager .................... H04N 7/162
348/732
2005/0091508 A1* 4/2005 Lee ......................... G06F 21/10
713/182

(Continued)

FOREIGN PATENT DOCUMENTS

CN 1934852 A 3/2007
CN 101127878 A 2/2008
(Continued)

OTHER PUBLICATIONS

International Search Report from International Application No. PCT/CN2013/086825 dated Feb. 20, 2014.
(Continued)

*Primary Examiner* — Ellen Tran
(74) *Attorney, Agent, or Firm* — Brinks Gilson & Lione

(57) ABSTRACT

According to an embodiment of the present invention, a server divides data into multiple data segments, directly stores some of the data segments without encryption, and encrypts and stores the other data segments; the server receives, from the terminal, a download request of downloading the data, and sends the unencrypted data segments to the terminal; and the server receives an identity authentication request sent by the terminal, performs identity authentication on the terminal, and sends the encrypted data segments to the terminal after the identity authentication succeeds.

10 Claims, 6 Drawing Sheets

(52) U.S. Cl.
CPC ...... *H04L 63/08* (2013.01); *G06F 2221/0784* (2013.01); *G06F 2221/2107* (2013.01)

(56) References Cited

U.S. PATENT DOCUMENTS

| | | | |
|---|---|---|---|
| 2007/0198414 A1* | 8/2007 | Derrenberger | G06F 21/10 705/51 |
| 2009/0133103 A1 | 5/2009 | Sathyan et al. | |
| 2010/0235635 A1* | 9/2010 | Kshirsagar | H04L 63/0428 713/168 |
| 2011/0107235 A1* | 5/2011 | Woo | H04N 21/42222 715/748 |

FOREIGN PATENT DOCUMENTS

| | | |
|---|---|---|
| CN | 101489094 A | 7/2009 |
| CN | 102025490 A | 4/2011 |

OTHER PUBLICATIONS

Office Action from Chinese Application No. 2017042801641760 dated May 4, 2017.
International Preliminary Report on Patentability from International Application No. PCT/CN2013/086825 dated Jun. 25, 2015.

* cited by examiner

701 — A terminal plays unencrypted data segments, and performs identity authentication on a user using the terminal; and if the identity authentication succeeds, plays encrypted data segments after the playing of the unencrypted data segments is completed
FIG. 7
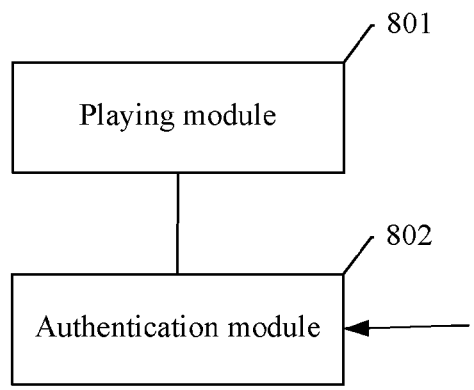
FIG. 8A
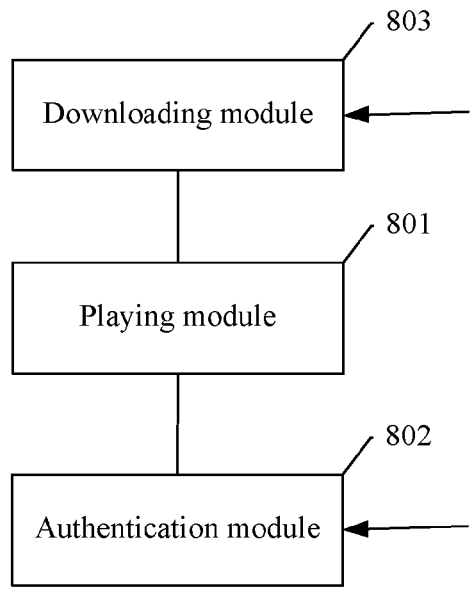
FIG. 8B

METHOD, SYSTEM, SERVER AND TERMINAL FOR IMPLEMENTING SECURE TRANSMISSION OF DATA

RELATED APPLICATION

This application is a continuation of International Application No. PCT/CN2013/086825, filed on Nov. 11, 2013, which claims priority to Chinese Patent Application No. 2012105352667, entitled "METHOD, SYSTEM, SERVER AND TERMINAL FOR IMPLEMENTING SECURE TRANSMISSION OF DATA" filed on Dec. 12, 2012, which is incorporated by reference in its entirety.

FIELD OF THE TECHNOLOGY

The present disclosure relates to the field of data security technologies, and in particular, to a method, system, server and terminal for implementing secure transmission of data.

BACKGROUND OF THE DISCLOSURE

In data security technologies, generally, fully encrypted data (such as video data and audio data) is stored in a server, a personal computer (PC) client sends, to a server, a download request of downloading the data, and the server performs identity authentication on the client. If the authentication succeeds, the server returns, to the client, a decryption key of the data requested to be downloaded; the client downloads the encrypted data from the server, and decrypts the data by using the previously received decryption key while playing the data.

SUMMARY

Embodiments of the present invention provide a method, system, server and terminal for implementing secure transmission of data, which can reduce waiting time of a terminal while ensuring secure transmission of data.

A method for implementing secure transmission of data, including:

dividing, by a server, data into multiple data segments, directly storing some of the data segments without encryption, and encrypting and storing the other data segments;

receiving, by the server from a terminal, a download request of downloading the data, and sending the unencrypted data segments to the terminal; and receiving, by the server, an identity authentication request sent by the terminal, performing identity authentication on the terminal, and sending the encrypted data segments to the terminal after the identity authentication succeeds.

A method for implementing secure transmission of data, including:

sending, by a terminal to a server, a download request of downloading data, and receiving unencrypted data segments of the data that are sent by the server; and playing, by the terminal, the unencrypted data segments, sending an identity authentication request to the server, and after identity authentication on the terminal by the server succeeds, receiving encrypted data segments of the data that are sent by the server.

A method for implementing secure transmission of data, the data being divided into multiple data segments, some of the data segments being directly stored without encryption, and the other data segments being encrypted and stored; the method including:

playing, by a terminal, the unencrypted data segments, and performing identity authentication on a user using the terminal; and if the identity authentication succeeds, playing the encrypted data segments after the playing of the unencrypted data segments is completed.

A system for implementing secure transmission of data, including:

a server, configured to divide data into multiple data segments, directly store some of the data segments without encryption, and encrypt and store the other data segments; send the unencrypted data segments to a terminal upon receiving, from the terminal, a download request of downloading the data; and perform identity authentication on the terminal upon receiving an identity authentication request from the terminal, and if the identity authentication succeeds, send the encrypted data segments to the terminal; and the terminal, configured to: upon receiving the unencrypted data segments, play the unencrypted data segments, and send the identity authentication request to the server; and upon receiving the encrypted data segments, decrypt the encrypted data segments and play the decrypted data segments.

A server for implementing secure transmission of data, including:

a data storage module, configured to divide data into multiple data segments, directly store some of the data segments without encryption, and encrypt and store the other data segments; and a data sending module, configured to receive, from a terminal, a download request of downloading the data, and send the unencrypted data segments stored in the data storage module to the terminal; and further configured to receive an identity authentication request sent by the terminal, perform identity authentication on the terminal, and send the encrypted data segments stored in the data storage module to the terminal after the identity authentication succeeds.

A terminal for implementing secure transmission of data, including:

a requesting module, configured to send a download request of downloading data to a server, and send an identity authentication request to the server according to a notification of a receiving module;

the receiving module, configured to receive unencrypted data segments of the data that are sent by the server, and instruct the requesting module to send the identity authentication request to the server; and receive encrypted data segments of the data that are sent by the server; and a playing module, configured to play the unencrypted data segments and the encrypted data segments.

A terminal for implementing secure transmission of data, the data being divided into multiple data segments, some of the data segments being directly stored without encryption, and the other data segments being encrypted and stored; the terminal including:

a playing module, configured to play the unencrypted data segments; and play the encrypted data segments according to a notification of an authentication module; and the authentication module, configured to perform identity authentication on a user using the terminal, and if the identity authentication succeeds, instruct, after the playing module completes the playing of the unencrypted data segments, the playing module to play the encrypted data segments.

It can be seen that in the technical solutions of implementing secure transmission of data that are provided in the embodiments of the present invention, data is divided into multiple data segments, some of the data segments are directly stored without encryption, and the other data segments are encrypted and stored; a terminal can directly download and play the unencrypted data segments of the data, and at the same time perform identity authentication and download the other encrypted data segments. Because processes such as identity authentication can be implemented while the unencrypted data segments are being played, waiting time of the terminal is reduced.

BRIEF DESCRIPTION OF THE DRAWINGS

FIG. 7 is a schematic flowchart of a method for implementing secure transmission of data according to an embodiment of the present invention;

FIG. 8A is a schematic structural diagram of another terminal for implementing secure transmission of data according to an embodiment of the present invention;

FIG. 8B is a schematic structural diagram of another terminal for implementing secure transmission of data according to an embodiment of the present invention;

DESCRIPTION OF EMBODIMENTS

Generally, in data security technologies, because the whole data is encrypted, a PC client needs to obtain a decryption key in order to decrypt the data and play the decrypted data. In order to acquire the decryption key, the PC client and a server must perform multiple network interaction activities, including identity authentication and decryption key transmission. In the case of an unstable network environment, these network interaction activities will consume a lot of time, which greatly increases waiting time of a user.

Accordingly, embodiments of the present invention provide a method, system, server and terminal for implementing security transmission of data. In the embodiments of the present invention, data is divided into multiple data segments, some of the data segments are directly stored without encryption, and the other data segments are encrypted and stored; a terminal can directly download and play the unencrypted data segments, and at the same time perform identity authentication and download the other encrypted data segments. Because processes such as identity authentication can be implemented while the unencrypted data segments are being played, waiting time of the terminal is reduced.

Figure 1:
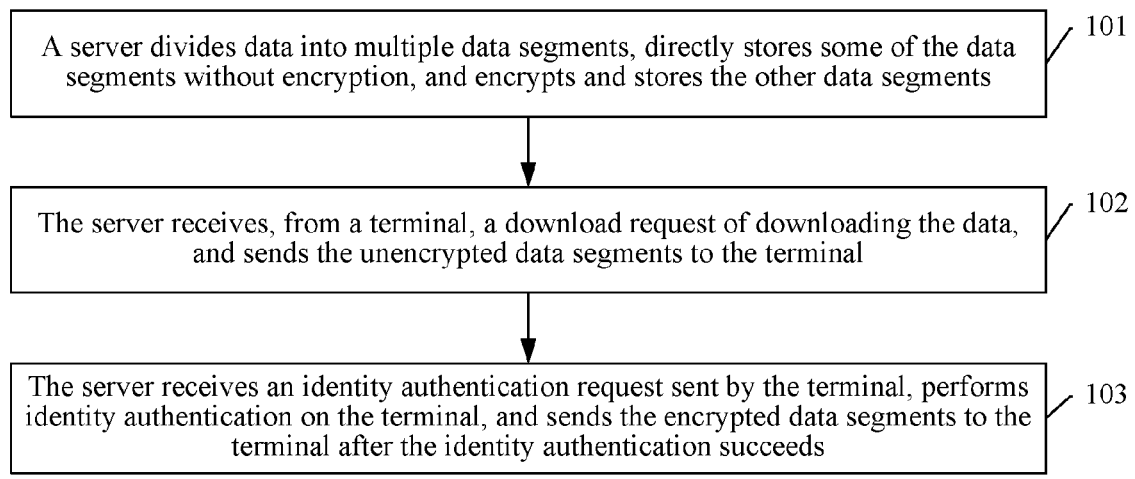
FIG. 1 is a schematic flowchart of a method for implementing secure transmission of data according to an embodiment of the present invention.

An embodiment of the present invention provides a method for implementing secure transmission of data, and FIG. 1 is a flowchart of the method provided in this embodiment of the present invention. As shown in FIG. 1, the method may include:

Step 101: A server divides data into multiple data segments, directly stores some of the data segments without encryption, and encrypts and stores the other data segments.

Step 102: The server receives, from a terminal, a download request of downloading the data, and sends the unencrypted data segments to the terminal.

Step 103: The server receives an identity authentication request sent by the terminal, performs identity authentication on the terminal, and sends the encrypted data segments to the terminal after the identity authentication succeeds.

In step 103, the terminal may send the identity authentication request when playing the unencrypted data segments.

If the identity authentication on the terminal by the server fails, an authentication failure message may be sent to the terminal.

To solve the delay problem caused by network congestion, after the terminal sends the identity authentication request to the server, the method may further include: starting, by the terminal, a timer, and when the timer expires, determining whether a response is received from the server (in this embodiment of the present invention, the response may be the encrypted data segments or the authentication failure message), and if no response is received from the server, executing the step of sending an identity authentication request to the server again. Herein, the time length of the timer may be prolonged as the number of times of sending of the identity authentication request increases, thereby avoiding sending too many identity authentication requests to cause more serious network congestion.

When the identity authentication on the terminal by the server fails, the terminal may send an identity authentication request to the server again before the terminal completes the playing of the unencrypted data segments. After receiving the identity authentication request that is sent by the terminal again, the server performs identity authentication on the terminal again, and sends the encrypted data segments to the terminal if the identity authentication succeeds.

According to an embodiment of the present invention, in the above method, the terminal may play the unencrypted data segments again if the encrypted data segments sent by the server are still not received after the terminal completes the playing of the unencrypted data segments.

According to an embodiment of the present invention, in the above method, after the identity authentication on the terminal by the server succeeds, the server may further send a decryption key to the terminal; the terminal decrypts the encrypted data segments by using the received decryption key, and plays the decrypted data segments. Alternatively, according to another embodiment of the present invention, the terminal may pre-store a decryption key, and after receiving the encrypted data segments sent by the server, the terminal decrypts the encrypted data segments directly by using the decrypted key stored therein, and plays the decrypted data segments.

Figure 2:
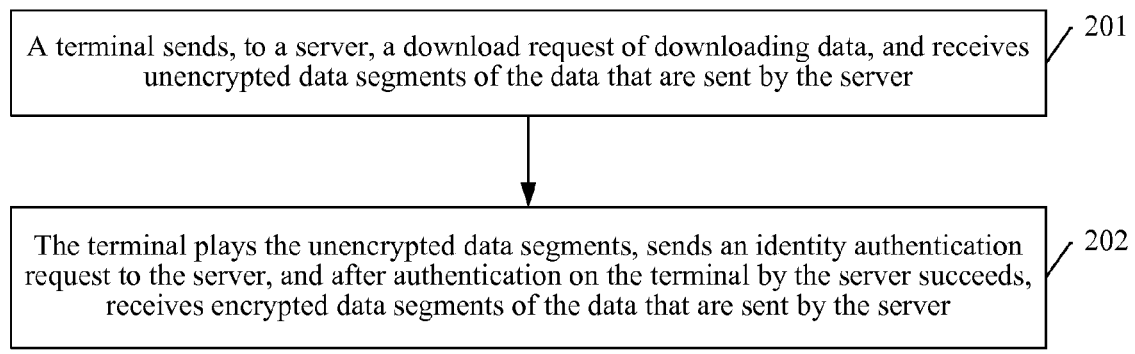
FIG. 2 is a schematic flowchart of a method for implementing secure transmission of data according to an embodiment of the present invention.

An embodiment of the present invention further provides another method for implementing secure transmission of data, and FIG. 2 is a flowchart of the method provided in this embodiment of the present invention. As shown in FIG. 2, the method may include:

Step 201: A terminal sends, to a server, a download request of downloading data, and receives unencrypted data segments of the data that are sent by the server.

Step 202: The terminal plays the unencrypted data segments, sends an identity authentication request to the server, and after authentication on the terminal by the server succeeds, receives encrypted data segments of the data that are sent by the server.

Before step 201, the method further includes: dividing, by the server, the data into multiple data segments, directly storing some of the data segments without encryption, and encrypting and storing the other data segments.

According to an embodiment of the present invention, in step 202, the terminal may send the identity authentication request when playing the unencrypted data segments.

According to an embodiment of the present invention, after the terminal sends the identity authentication request to the server, the method may further include: starting, by the terminal, a timer, and when the timer expires, determining whether a response is received from the server, and if no response is received, executing again the step of sending an identity authentication request to the server. The response may be the encrypted data segments sent by the server or an authentication failure message.

According to an embodiment, the method may further include:

when the identity authentication on the terminal by the server fails, sending, by the terminal, an identity authentication request to the server again before the terminal completes the playing of the unencrypted data segments, so that the server performs identity authentication on the terminal again, and if the identity authentication succeeds, sends the encrypted data segments to the terminal.

According to an embodiment, the method may further include:

playing the unencrypted data segments again if the encrypted data segments sent by the server are still not received after the terminal completes the playing of the unencrypted data segments.

According to an embodiment of the present invention, in step 202, after the identity authentication on the terminal by the server succeeds, the server may further send a decryption key to the terminal; the terminal receives the decryption key, decrypts the encrypted data segments by using the received decryption key, and plays the decrypted data segments. Alternatively, according to another embodiment of the present invention, the terminal may pre-store a decryption key, and after receiving the encrypted data segments sent by the server, the terminal decrypts the encrypted data segments directly by using the decrypted key stored therein, and plays the decrypted data segments.

In the above two methods, the terminal may be a client, and may be implemented by using a computer device.

A specific embodiment is described in detail below by way of example.

Figure 3:
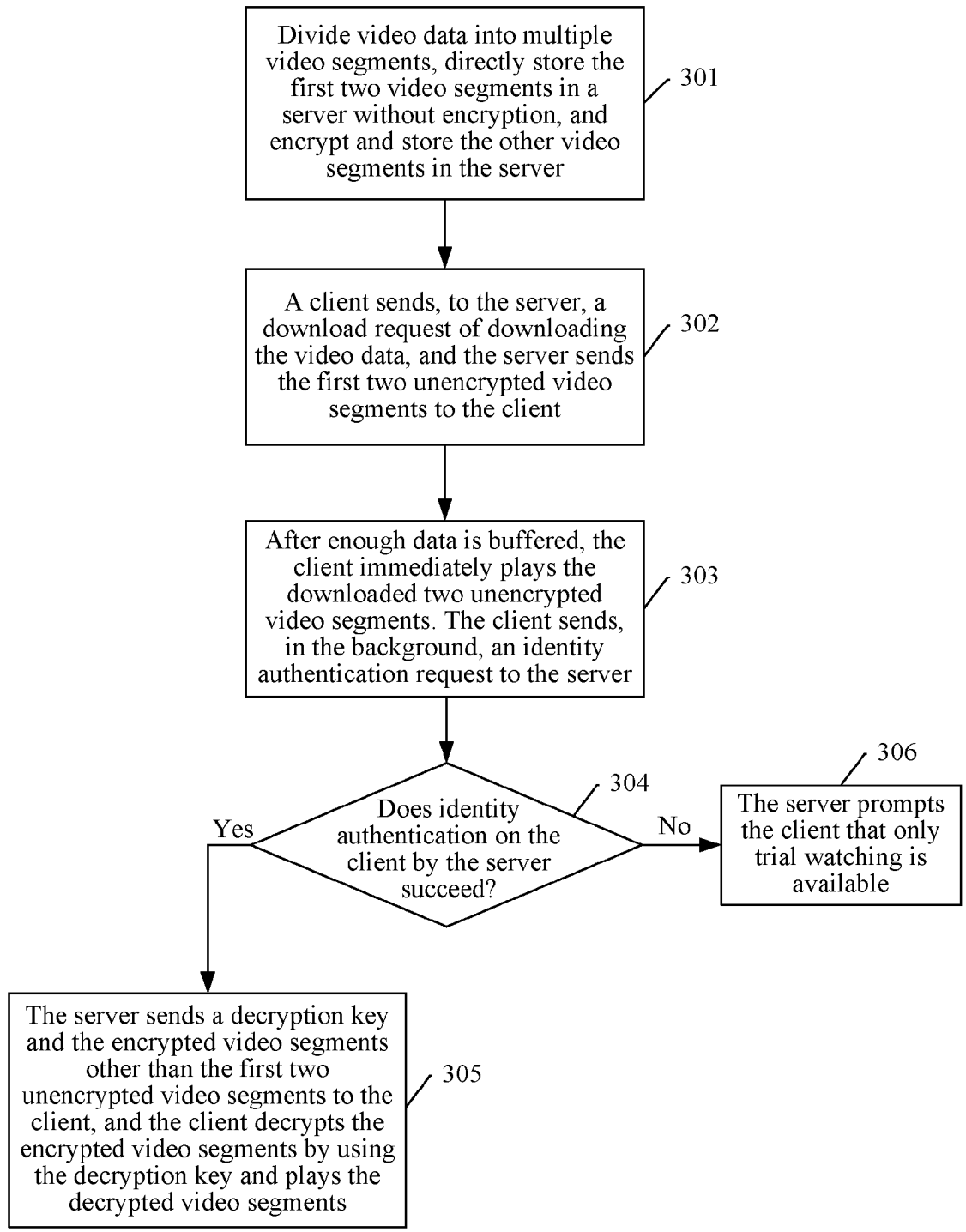
FIG. 3 is a schematic flowchart of a method for implementing secure transmission of data according to an embodiment of the present invention.

This embodiment is described by using video data as an example, and FIG. 3 is a flowchart of the method provided in this embodiment of the present invention. As shown in FIG. 3, the method may include:

Step 301: A server divides video data of a program into video segments each of 5 minutes. The first two video segments are not encrypted and are directly stored in the server. A unique encryption key and a decryption key are generated for the program by using a particular key generation algorithm, all video segments except the first two video segments are encrypted by using the encryption key, and the encrypted video segments are stored in the server.

Step 302: When a user views the program, a client sends, to the server, a download request of downloading the video data of the program, and the server sends the first two unencrypted video segments to the client.

Step 303: After enough data is buffered, the client can immediately play the downloaded two unencrypted video segments. After playing is started, the client sends, in the background, an identity authentication request to the server.

Step 304: The server performs identity authentication on the client, and if the authentication fails, in step 306, prompts the client that only trial watching is available. If the authentication succeeds, step 305 is executed.

Step 305: The server sends the decryption key and the encrypted video segments other than the first two unencrypted video segments to the client, and the client decrypts the encrypted video segments by using the decryption key and plays the decrypted video segments.

According to this embodiment of the present invention, after sending the identity authentication request, the client may start a timer, and after the timer expires, if no response is received from the server, may send an identity authentication request again, and start the timer again. In this embodiment of the present invention, the time length of the timer may be prolonged as the number of times of sending of the identity authentication request increases.

In this embodiment of the present invention, the time period during which the client plays the first two unencrypted video segments, which is for example 10 minutes, is sufficient for implementing behaviors such as identity authentication and decryption key transmission. Before starting to play the encrypted video segments, the client already obtains the decryption key, and can decrypt the encrypted video segments directly by using the decryption key without waiting. Behaviors related to digital right protection, such as identity authentication and key transmission, are all performed in the background, and do not increase the waiting time of the user.

Figure 4:
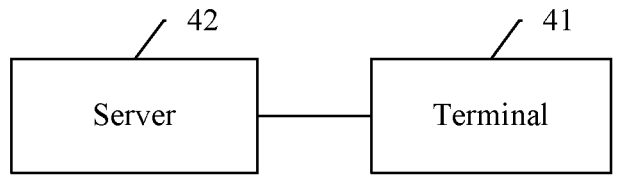
FIG. 4 is a schematic structural diagram of a system for implementing secure transmission of data according to an embodiment of the present invention.

An embodiment of the present invention further provides a system for implementing secure transmission of data, and FIG. 4 is a schematic structural diagram of the system. As shown in FIG. 4, the system may include a terminal 41 and a server 42.

The server 42 divides data into multiple data segments, directly stores some of the data segments without encryption, and encrypts and stores the other data segments; sends the unencrypted data segments to the terminal 41 upon receiving, from the terminal 41, a download request of downloading the data; and performs identity authentication on the terminal 41 upon receiving an identity authentication request from the terminal 41, and if the identity authentication succeeds, sends the encrypted data segments to the terminal 41.

Upon receiving the unencrypted data segments sent by the server 42, the terminal 41 plays the unencrypted data segments, and sends the identity authentication request to the server 42; and upon receiving the encrypted data segments sent by the server 42, the terminal decrypts the encrypted data segments and plays the decrypted data segments.

In the above system, if the identity authentication on the terminal 41 by the server 42 succeeds, the server further sends a decryption key to the terminal 41; and the terminal 41 decrypts the encrypted data segments by using the decryption key and plays the decrypted data segments.

Figure 5A:
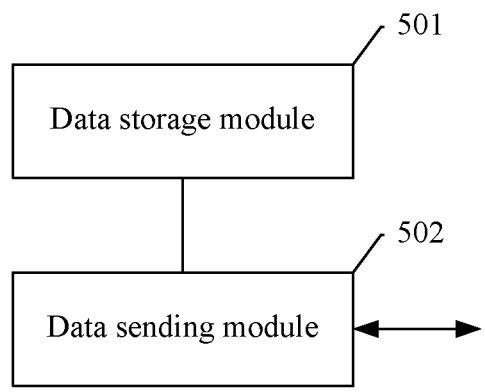
FIG. 5A is a schematic structural diagram of a server for implementing secure transmission of data according to an embodiment of the present invention.

An embodiment of the present invention further provides a server for implementing secure transmission of data, and FIG. 5A is a schematic structural diagram of the server. As shown in FIG. 5A, the server may include:

a data storage module 501, configured to divide data into multiple data segments, directly store some of the data segments without encryption, and encrypt and store the other data segments; and a data sending module 502, configured to receive, from a terminal, a download request of downloading the data, and send the unencrypted data segments stored in the data storage module 501 to the terminal; and further configured to receive an identity authentication request sent by the terminal, perform identity authentication on the terminal, and send the encrypted data segments stored in the data storage module 501 to the terminal after the identity authentication succeeds.

The data sending module 502 is further configured to: send a decryption key to the terminal after the identity authentication succeeds, so that the terminal decrypts the encrypted data segments by using the decryption key, and plays the decrypted data segments.

The data sending module 502 is further configured to: when the identity authentication on the terminal fails, receive an identity authentication request that is sent by the terminal again before the terminal completes playing of the unencrypted data segments, perform identity authentication on the terminal again, and if the identity authentication succeeds, send the encrypted data segments stored in the data storage module 501 to the terminal.

Figure 5B:
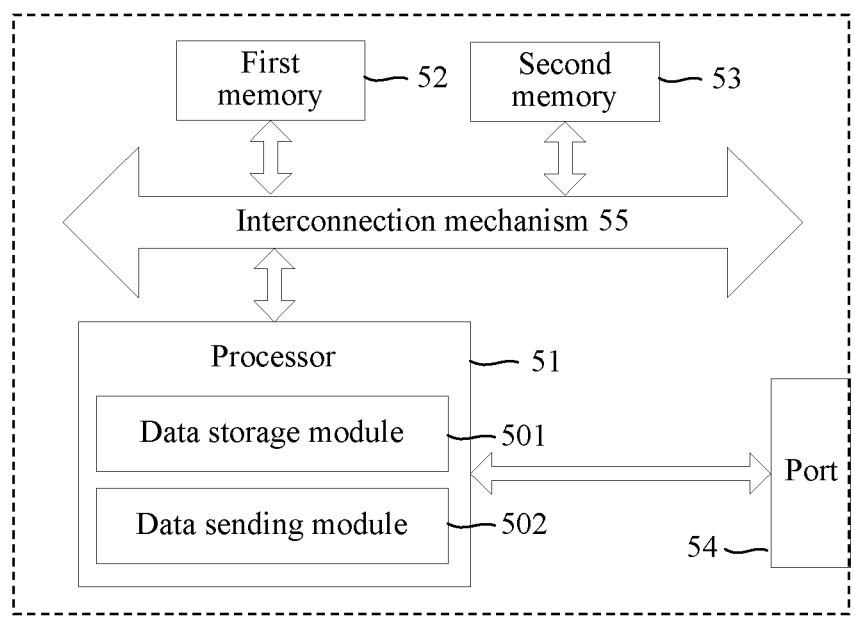
FIG. 5B is a schematic hardware structural diagram of a server for implementing secure transmission of data according to an embodiment of the present invention.

FIG. 5B is a schematic hardware structural diagram of a server for implementing secure transmission of data according to an embodiment of the present invention. As shown in FIG. 5B, the server may include: a processor 51, a first memory 52, a second memory 53, at least one port 54, and an interconnection mechanism 55. The processor 51, the first memory 52 and the second memory 53 are interconnected by means of the interconnection mechanism 55. The server can receive and send data information through the port 54, Herein, the first memory 52 stores machine readable instructions; and the processor 51 executes the machine readable instructions to execute the following operations:

dividing data into multiple data segments, directly storing some of the data segments without encryption in the second memory 53, and encrypting and storing the other data segments in the second memory 53;

receiving, from a terminal, a download request of downloading the data, and sending the unencrypted data segments stored in the second memory 53 to the terminal; and receiving an identity authentication request sent by the terminal, performing identity authentication on the terminal, and sending the encrypted data segments stored in the second memory 53 to the terminal after the identity authentication succeeds.

In this embodiment of the present invention, the processor 51 may execute the machine readable instructions stored in the first memory 52 to further execute all or some of the processes in the method embodiment shown in FIG. 1, and the details are not described herein again.

It can be seen that when the machine readable instructions stored in the first memory 52 are executed by the processor 51, the functions of the data storage module 501 and the data sending module 502 can be implemented.

Figure 6A:
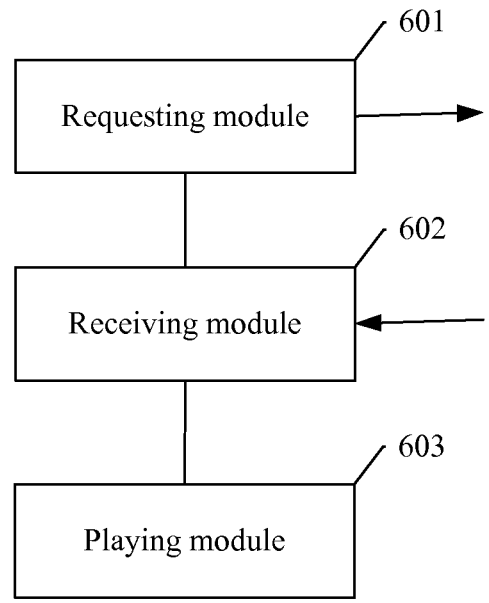
FIG. 6A is a schematic structural diagram of a terminal for implementing secure transmission of data according to an embodiment of the present invention.

An embodiment of the present invention further provides a terminal for implementing secure transmission of data, and FIG. 6A is a schematic structural diagram of the terminal. As shown in FIG. 6A, the terminal may include:

a requesting module 601, configured to send a download request of downloading data to a server, and send an identity authentication request to the server according to a notification of a receiving module 602;

the receiving module 602, configured to receive unencrypted data segments of the data that are sent by the server, and instruct the requesting module 601 to send the identity authentication request to the server; and receive encrypted data segments of the data that are sent by the server; and a playing module 603, configured to play the unencrypted data segments and the encrypted data segments.

According to an embodiment of the present invention, the receiving module 602 is further configured to receive a decryption key sent by the server; and the playing module 603 decrypts, by using the decryption key, the encrypted data segments received by the receiving module 602, and plays the decrypted data segments.

According to an embodiment of the present invention, the requesting module 601 is further configured to: start a timer after sending the identity authentication request to the server, and when the timer expires, determine whether the receiving module 602 receives a response from the server, and if no response is received, send an identity authentication request to the server again.

According to an embodiment of the present invention, the requesting module 601 is further configured to: when the identity authentication on the terminal by the server fails, send an identity authentication request to the server again before the playing module 603 completes the playing of the unencrypted data segments, so that the server performs identity authentication on the terminal again, and if the identity authentication succeeds, sends the encrypted data segments to the terminal.

According to an embodiment of the present invention, the playing module 603 is further configured to: play the unencrypted data segments again if the receiving module 602 still does not receive the encrypted data segments sent by the server after the playing of the unencrypted data segments is completed.

Figure 6B:
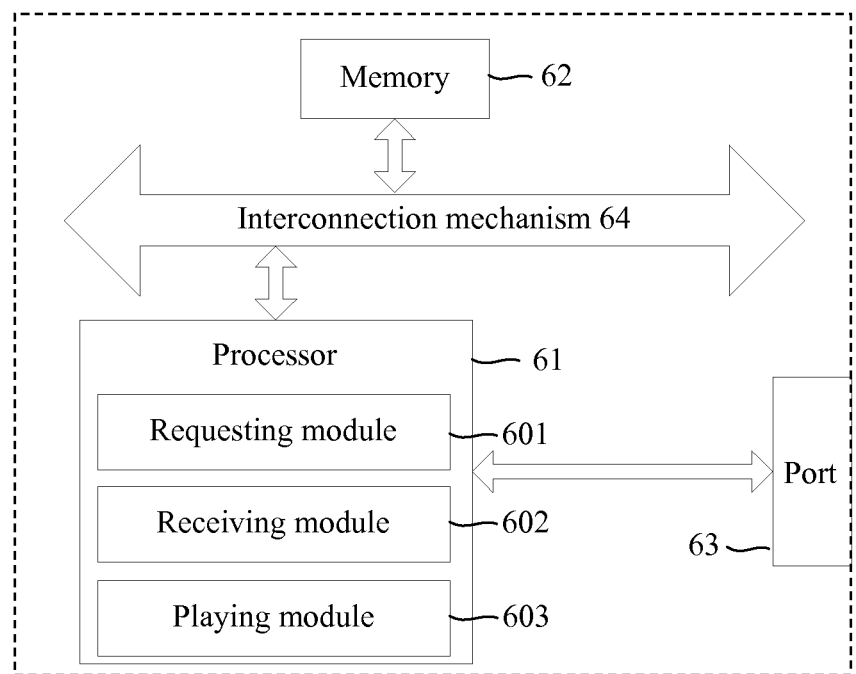
FIG. 6B is a schematic hardware structural diagram of a terminal for implementing secure transmission of data according to an embodiment of the present invention.

FIG. 6B is a schematic hardware structural diagram of a terminal for implementing secure transmission of data according to an embodiment of the present invention. As shown in FIG. 6B, the terminal may include: a processor 61, a memory 62, at least one port 63, and an interconnection mechanism 64. The processor 61 and the memory 62 are interconnected by means of the interconnection mechanism 64. The terminal can receive and send data information through the port 63, Herein, the memory 62 stores machine readable instructions; and the processor 61 executes the machine readable instructions to execute the following operations:

sending, to a server, a download request of downloading data, and receiving unencrypted data segments of the data that are sent by the server; and playing the unencrypted data segments, sending an identity authentication request to the server, and after identity authentication on the terminal by the server succeeds, receiving encrypted data segments of the data that are sent by the server.

In this embodiment of the present invention, the processor 61 can execute the machine readable instructions stored in the memory 62 to further execute all or some of the processes in the method embodiment shown in FIG. 2, and the details are not described herein again.

It can be seen that when the machine readable instructions stored in the memory 62 are executed by the processor 61, the functions of the requesting module 601, the receiving module 602 and the playing module 603 can be implemented.

FIG. 7 is a schematic flowchart of a method for implementing secure transmission of data according to an embodiment of the present invention. In this embodiment of the present invention, data is divided into multiple data segments, some of the data segments are directly stored without encryption, and the other data segments are encrypted and stored. As shown in FIG. 7, the method may include:

Step 701: A terminal plays the unencrypted data segments, and performs identity authentication on a user using the terminal; and if the identity authentication succeeds, plays the encrypted data segments after the playing of the unencrypted data segments is completed.

In the above method, the data may be downloaded from the server and stored by the terminal during previous playing, or may be pre-stored locally by the terminal.

In the above method, when the identity authentication succeeds, after the playing of the unencrypted data segments is completed and before the encrypted data segments are played, the method may further include:

determining, by the terminal, whether the terminal has buffered a decryption key; and if the decryption key has been buffered, decrypting the encrypted data segments by using the decryption key, and continuing to execute the step of playing the encrypted data segments; or if the decryption key has not been buffered, downloading the decryption key from the server and buffering the decryption key, decrypting the encrypted data segments by using the decryption key, and continuing to execute the step of playing the encrypted data segments.

All or some of the processes in the methods provided in the embodiments of the present invention may be executed by a computer device, and the computer device may be a personal computer, a server, or a portable computer (such as a notebook computer or a tablet computer). The computer device may include at least one processor and memory. The memory stores machine readable instructions, and when the machine readable instructions are executed by the processor, all or some of the processes in the embodiments of the methods of the present disclosure can be implemented. The memory may be a magnetic disk, an optical disc, a read-only memory (ROM), a random access memory (RAM), or the like.

FIG. 8A is a schematic structural diagram of another terminal for implementing secure transmission of data according to an embodiment of the present invention. In this embodiment of the present invention, data is divided into multiple data segments, some of the data segments are directly stored without encryption, and the other data segments are encrypted and stored. As shown in FIG. 8A, the terminal may include:

a playing module 801, configured to play the unencrypted data segments; and play the encrypted data segments according to a notification of an authentication module 802; and the authentication module 802, configured to perform identity authentication on a user using the terminal, and if the identity authentication succeeds, instruct, after the playing module 801 completes the playing of the unencrypted data segments, the playing module 801 to play the encrypted data segments.

According to an embodiment of the present invention, as shown in FIG. 8B, the terminal may further include: a downloading module 803, configured to download the data from the server and store the data.

In the above terminal, the authentication module 802 is further configured to: when the identity authentication succeeds, determine whether the terminal has buffered a decryption key; and if the decryption key has been buffered, instruct the playing module 801 to decrypt the encrypted data segments by using the decryption key and play the decrypted data segments; or if the decryption key has not been buffered, download the decryption key from the server and buffer the decryption key, and instruct the playing module 801 to decrypt the encrypted data segments by using the decryption key and play the decrypted data segments.

Figure 8C:
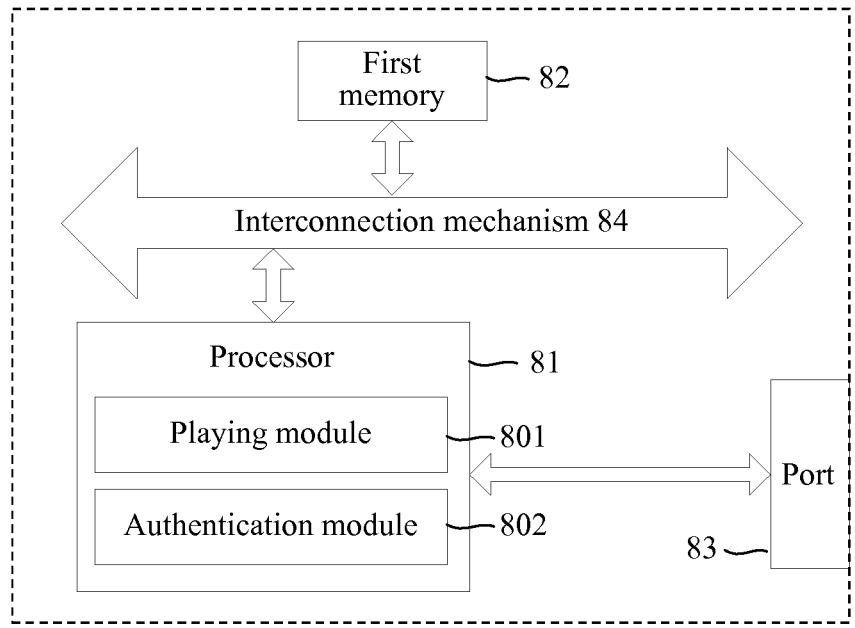
FIG. 8C is a schematic hardware structural diagram of another terminal for implementing secure transmission of data according to an embodiment of the present invention.

FIG. 8C is a schematic hardware structural diagram of a terminal for implementing secure transmission of data according to an embodiment of the present invention. In this embodiment of the present invention, data is divided into multiple data segments, some of the data segments are directly stored without encryption, and the other data segments are encrypted and stored. As shown in FIG. 8C, the terminal may include: a processor 81, a first memory 82, at least one port 83, and an interconnection mechanism 84. The processor 81 and the first memory 82 are interconnected by means of the interconnection mechanism 84. The terminal can receive and send data information through the port 83, Herein, the first memory 82 stores machine readable instructions; and the processor 81 executes the machine readable instructions to execute the following operations:

playing the unencrypted data segments, and performing identity authentication on a user using the terminal; and if the identity authentication succeeds, playing the encrypted data segments after the playing of the unencrypted data segments is completed.

Figure 8D:
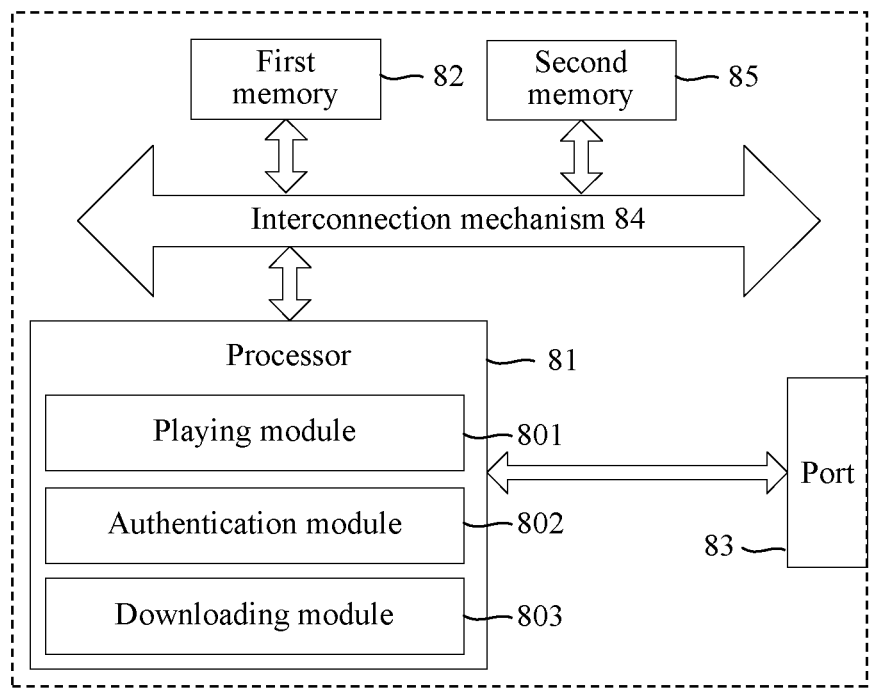
FIG. 8D is a schematic hardware structural diagram of another terminal for implementing secure transmission of data according to an embodiment of the present invention.

As shown in FIG. 8D, the terminal may further include a second memory 85; and the processor 81 executes the machine readable instructions to further execute the following operations:

downloading the data from the server, and storing the data in the second memory 85.

In this embodiment of the present invention, the processor 81 can execute the machine readable instructions stored in the first memory 82 to further execute all or some of the processes in the method embodiment shown in FIG. 7, and the details are not described herein again.

It can be seen that when the machine readable instructions stored in the first memory 82 are executed by the processor 81, the functions of the playing module 801, the authentication module 802 and the downloading module 803 can be implemented.

Based on the above, in the technical solutions of implementing secure transmission of data that are provided in the embodiments of the present invention, a piece of data is divided into multiple data segments, some of the data segments are directly stored without encryption, and the other data segments are encrypted and stored; a terminal can directly download and play the unencrypted data segments, and at the same time perform identity authentication and download the encrypted data segments and a decryption key. Because processes such as identity authentication can be implemented while the unencrypted data segments are being played, waiting time of the terminal is reduced.

The modules in the embodiments of the present invention may be implemented by software (for example, machine readable instructions stored in a computer readable medium and executed by a processor), implemented by hardware (for example, an application specific integrated circuit (ASIC) processor), or implemented by a combination of software and hardware, which is not specifically limited in the embodiments of the present invention.

The modules in the embodiments of the present invention may be integrated, or may be deployed separately; and may be combined into one module, or may be further divided into multiple sub-modules.

Hardware modules in the embodiments of the present invention may be implemented in a mechanical or electrical manner. For example, a hardware module may include a specially designed permanent circuit or logic device (for example, a dedicated processor, such as an FPGA or an ASIC) for implementing particular operations. The hardware module may also include a programmable logic device or circuit (for example, including a general purpose processor or other programmable processors) that is temporarily configured by software and configured to execute particular operations. Specifically, whether the hardware module is implemented in a mechanical manner, or by using a dedicated permanent circuit, or by using a temporarily configured circuit (for example, configured by using software) may be determined depending on the cost and time considerations.

Based on the descriptions of the foregoing embodiments, a person skilled in the art may clearly understand that the present disclosure may be implemented by using software and a necessary universal hardware platform, that is, implemented by machine readable instructions instructing relevant hardware, or may definitely be implemented by using hardware; however, in most cases, the former is preferred. Based on such understanding, the technical solutions of the present disclosure essentially or the part contributing to the prior art may be implemented in the form of a software product. The computer software product is stored in a storage medium, and includes several instructions for instructing a terminal device (which may be a mobile phone, a personal computer, a server, a network device, or the like) to execute the method described in each of the embodiments of the present invention.

A person of ordinary skill in the art should understand that all or some of the processes in the methods of the foregoing embodiments may be implemented by machine readable instructions instructing relevant hardware modules, and the machine readable instructions may be stored in a computer readable storage medium. When the machine readable instructions are executed, the processes of the embodiments of the methods as described above can be implemented. The storage medium may be a magnetic disk, an optical disc, a read-only memory (ROM), a random access memory (RAM), or the like.

The accompanying drawings in the embodiments of the present invention are merely some embodiments, and the modules and steps in these drawings are not necessary for implementing the present disclosure. The modules may be combined into one module or be further divided into multiple sub-modules.

The above descriptions are merely embodiments of the present invention, and are not intended to limit the present disclosure. Any modification, equivalent replacement, or improvement made without departing from the spirit and principle of the present disclosure shall fall within the protection scope of the present disclosure.

What is claimed is:

1. A method for implementing secure transmission of data, comprising:
    dividing, by a server, data into multiple data segments, directly storing some of the data segments without encryption, and encrypting and storing the other data segments;
    receiving, by the server from a terminal, a download request of downloading the data, and sending the unencrypted data segments to the terminal;
    receiving, by the server, an identity authentication request sent by the terminal, performing identity authentication on the terminal;
    receiving and playing, by the terminal, the unencrypted data segments;
    starting, by the terminal, a timer with a first expiration time length after sending the identity authentication request to the server;
    determining, by the terminal when the timer with the first expiration time length expires, whether a response is received from the server, and if no response is received:
        sending the identity authentication request to the server again;
        restarting the timer with a second expiration time length longer than the first expiration time length; and
    determining by the terminal when the timer with the second expiration time length expires, whether the response is received, and if no response is received, sending the identity authentication request to the server again,
    wherein the response is the encrypted data segments sent by the server or an authentication failure message; and
    sending, by the server, the encrypted data segments to the terminal after the identity authentication succeeds.

2. The method according to claim 1, further comprising:
    receiving, by the server when the identity authentication fails, the identity authentication request that is sent by the terminal again before the terminal completes playing of the unencrypted data segments, and performing identity authentication on the terminal again; and sending the encrypted data segments to the terminal if the identity authentication succeeds.

3. The method according to claim 1, further comprising:
    sending a decryption key to the terminal after the identity authentication succeeds, so that the terminal decrypts the encrypted data segments by using the decryption key, and plays the decrypted data segments.

4. The method according to claim 2, further comprising:
    sending a decryption key to the terminal after the identity authentication succeeds, so that the terminal decrypts the encrypted data segments by using the decryption key, and plays the decrypted data segments.

5. The method according to claim 1, further comprising:
    playing, by the terminal, the unencrypted data segments again if the encrypted data segments sent by the server are still not received after the terminal completes playing of the unencrypted data segments.

6. A method for implementing secure transmission of data, comprising:
    sending, by a terminal to a server, a download request of downloading data, and receiving unencrypted data segments of the data that are sent by the server;

playing, by the terminal, the unencrypted data segments, sending an identity authentication request to the server;

starting, by the terminal, a timer with a first expiration time length;

determining, by the terminal when the timer with the first expiration time length expires, whether a response is receive from the server, and if no response is received:

sending the identity authentication request to the server again;

restarting the timer with a second expiration time length longer than the first expiration time length; and determining by the terminal when the timer with the second expiration time length expires, whether the response is received, and if no response is received, sending the identity authentication request to the server again, wherein the response is the encrypted data segments sent by the server or an authentication failure message; and after identity authentication on the terminal by the server succeeds, receiving encrypted data segments of the data that are sent by the server.

7. The method according to claim 6, further comprising:
sending, by the terminal when the identity authentication fails, the identity authentication request to the server again before the terminal completes the playing of the unencrypted data segments, so that the server performs identity authentication on the terminal again, and if the identity authentication succeeds, sending the encrypted data segments to the terminal.

8. The method according to claim 6, further comprising:
receiving, by the terminal, a decryption key sent by the server; and
decrypting, by the terminal, the encrypted data segments by using the decryption key, and playing the decrypted data segments.

9. The method according to claim 6, further comprising:
playing, by the terminal, the unencrypted data segments again if the encrypted data segments sent by the server are still not received after the terminal completes playing of the unencrypted data segments.

10. A system for implementing secure transmission of data, comprising:

a terminal comprising a first processor in communication with a first memory storing a first set of instructions executed by the first processor; and a server comprising a second processor in communication with a second memory storing a second set of instructions executed by the second processor;

wherein the second processor, when executing the second set of instructions, is configured to cause the server to:

divide data into multiple data segments, directly store some of the data segments without encryption, and encrypt and store the other data segments;

receive, from a terminal, a download request of downloading the data, and send the unencrypted data segments to the terminal;

receive an identity authentication request sent by the terminal, perform identity authentication on the terminal, and send the encrypted data segments to the terminal after the identity authentication succeeds;

wherein the first processor, when executing the first set of instructions, is configured to cause the terminal to:

play the unencrypted data segments sent by the server;

start a timer with a first expiration time length after sending the identity authentication request to the server;

determine, when the timer with the first expiration time length expires, whether a response is received from the server, and if no response is received:

send an identity authentication request to the server again;

restart the timer with a second expiration time length longer than the first expiration time length; and determine when the timer with the second expiration time length expires, whether the response is received, and if no response is received, send the identity authentication request to the server again, wherein the response is the encrypted data segments sent by the server or an authentication failure message; and play the unencrypted data segments again if the encrypted data segments sent by the server are still not received after the terminal completes playing of the unencrypted data segments.

* * * * *